United States Patent
Shin et al.

(10) Patent No.: US 7,260,327 B1
(45) Date of Patent: Aug. 21, 2007

(54) METHOD AND APPARATUS FOR SUPPORTING OPERATIONS AND MAINTENANCE FUNCTIONALITY IN AN OPTICAL BURST SWITCHING NETWORK

(75) Inventors: Jong-Dug Shin, Seoul (KR); Saravut Charcranoon, Richardson, TX (US); Hakki Candan Cankaya, Dallas, TX (US); Tarek S. El-Bawab, Richardson, TX (US)

(73) Assignee: Alcatel Lucent, Paris (FR)

( * ) Notice: Subject to any disclaimer, the term of this patent is extended or adjusted under 35 U.S.C. 154(b) by 715 days.

(21) Appl. No.: 10/431,817

(22) Filed: May 8, 2003

Related U.S. Application Data

(60) Provisional application No. 60/382,918, filed on May 22, 2002, provisional application No. 60/379,364, filed on May 10, 2002.

(51) Int. Cl.
*H04J 14/00* (2006.01)
(52) U.S. Cl. .......................... 398/51; 398/49; 398/54; 398/95
(58) Field of Classification Search ................ 398/43, 398/45–51, 54, 95, 196
See application file for complete search history.

(56) References Cited

U.S. PATENT DOCUMENTS

| | | | |
|---|---|---|---|
| 6,023,467 A * | 2/2000 | Abdelhamid et al. .... | 370/236.2 |
| 6,160,651 A * | 12/2000 | Chang et al. ................. | 398/79 |
| 6,708,000 B1 * | 3/2004 | Nishi et al. ..................... | 398/1 |
| 6,898,205 B1 * | 5/2005 | Chaskar et al. ............ | 370/450 |
| 6,963,564 B1 * | 11/2005 | Liu ............................. | 370/389 |

OTHER PUBLICATIONS

Tada et al., OA&M framework for Multiwavelength Photonic Transport Networks, Jun. 1996, IEEE Journal on Selected Areas in Communications, vol. 14, No. 5, pp. 916-919.*
Xiong et al., Control Architecture in Optical Burst-Switched WDM Networks, Oct. 2000, IEEE Journal on Selected Areas in Communications, vol. 18, No. 10, pp. 1839-1841, 1846.*
Kan et al. "Information Model of an Optical Burst Edge Switch," IEEE International Conference on Communications 2002, May 2, 2002, vol. 5, pp. 2717-2721.*
Qiao Chunming; Labeled Optical Burst Switching for IP-Over-WDM Integration; IEEE Communications Magazine; Sep. 2000; pp. 104-114; vol. 38, No. 9, USA.
Bischoff, et al.; Operation and Maintenance for an All-Optical Transport Network; IEEE Communications Magazine; Nov. 1996; pp. 136-142; vol. 34, No. 11; USA.
Zygmunt Haas; Optical Distribution Channel: An "Almost-all" Optical LAN Based on the Field-Coding Technique; 16th Conference on Local Computer Networks; Oct. 1991; pp. 128-136.

* cited by examiner

*Primary Examiner*—Christina Leung
(74) *Attorney, Agent, or Firm*—Danamraj & Youst, PC; Jessica W. Smith; V. Lawrence Sewell

(57) ABSTRACT

Apparatus and method for supporting operations and maintenance ("OAM") functionality in an OBS network is described. One embodiment is an OBS network having OAM functionality, the OBS network comprising a plurality of OBS nodes interconnected via links. Each of the OBS nodes comprises an OAM module ("OAMM") for processing information regarding OAM functions in the OBS network and a routing manager ("RM") for processing routing information; and wherein at least one wavelength in each of the links comprises an OAM/1 wavelength for OAM/1 transmissions between nodes, the OAM/1 transmissions comprising OAM activity information; wherein at least one wavelength in each of the links comprises a reference wavelength for providing a wavelength reference to which light generating devices in the OBS network lock; and wherein at least one wavelength in each of the links comprises a routing wavelength for providing routing information between nodes.

27 Claims, 12 Drawing Sheets

METHOD AND APPARATUS FOR SUPPORTING OPERATIONS AND MAINTENANCE FUNCTIONALITY IN AN OPTICAL BURST SWITCHING NETWORK

PRIORITY UNDER 35 U.S.C. §119(E) & 37 C.F.R. §1.78

This nonprovisional application claims priority based upon the following prior United States provisional patent applications entitled: (1) Operation and Maintenance Issues in Optical Burst-Switched Networks, Application No. 60/379,364, filed May 10, 2002, in the names of Jong-Dug Shin, Saravut Charcranoon, Hakki Candan Cankaya, and Tarek S. El-Bawab; and (2) Framework for Operation and Maintenance Procedures in Optical Burst Switched Networks, Application No. 60/382,918, filed May 22, 2002, in the names of Jong-Dug Shin, Saravut Charcranoon, Hakki Candan Cankaya, and Tarek S. El-Bawab, which are hereby incorporated by reference for all purposes.

BACKGROUND OF THE INVENTION

1. Technical Field of the Invention

The present invention generally relates to optical burst switching ("OBS") networks. More particularly, and not by way of any limitation, the present invention is directed to a method and apparatus for supporting operations and maintenance ("OAM") functionality in such networks.

2. Description of Related Art

In burst switching technology, such as, in particular, optical burst switching ("OBS") technology, data bursts ("DBs"), each of which is made up of multiple packets, are switched optically at core nodes, or routers, in the OBS network. A small control packet, called the Burst Header Packet ("BHP") travels an offset time ahead of each DB along the same DB route and configures the optical switch for the duration of the DBs at the core node. In short, each BHP travels an offset time ahead of its associated DB and establishes a path for the DB.

Two primary features distinguish OBS networks from other types of optical networks that one must bear in mind with regard to Operations and Maintenance ("OAM") issues in OBS networks. The first is that spectral (i.e., spatial) decoupling is used in transmitting a BHP and the DB associated therewith transparently from ingress to egress edge nodes with possible wavelength conversion for contention resolution at intermediate optical core nodes. As a result, both a proper mechanism to check on correlation between a DB and its associated BHP in the passage from ingress to egress edge nodes and a network-wide wavelength reference to offer wavelength standard to each node are required. Second, temporal decoupling between a BHP and its associated DB, which are modified/updated at each intermediate node, exists. This requires that timing information for each DB and BHP pair must be maintained until they reach the egress OBS edge node.

It is these two distinctive characteristics of OBS networks that may generate another set of OAM requirements and warrant a fresh look into OAM issues in connection with OBS networks. There are several potential OAM implementation problems in OBS networks caused by these features. Such potential problems include out-of-synchronization receipt of BHP and DB, orphan BHPs and DBs, optical switch fabric misconfiguration, burst misrouting, burstification process malfunction, and out of sequence arrival of bursts at the destination edge nodes, to name a few.

Operations and Maintenance ("OAM") architecture can be broken down into four main levels. The first such level is a functional architectural level, in which OAM architecture is considered in relation to OBS functionality. The second such level is a network architectural level, in which all necessary building blocks to provide OAM functionality on a network-wide level are identified along with their defined inter-relationships. The third such level is an informational and communication architectural level. This level addresses a model of communication, as well as an exchanged informational model among entities in the OAM architecture. The last such level is a node architectural level. This level describes how the previous three levels can be realized and integrated into an OBS node so as to achieve OAM objectives. At the node architectural level, the fundamental OAM building blocks needed to carry out OAM functions are provided and their interactions with other parts of the OBS node infrastructure are defined. In contrast to the network architectural level, focus at the node architectural level is on local OAM activities.

Currently in OBS networks, there is a lack of OAM functionality in the edge and core nodes to support performance monitoring, fault management defect and failure detection, and related information dissemination.

SUMMARY OF THE INVENTION

Accordingly, the present invention advantageously provides a method and apparatus for supporting OAM functionality in an OBS network.

One embodiment is an optical burst switching ("OBS") network having operation and maintenance ("OAM") functionality, the OBS network comprising a plurality of OBS nodes interconnected via links. Each of the OBS nodes comprises an OAM module ("OAMM") for processing information regarding OAM functions in the OBS network and a routing manager ("RM") for processing routing information; and wherein at least one wavelength in each of the links comprises an OAM/1 wavelength for OAM/1 transmissions between nodes, the OAM/1 transmissions comprising OAM activity information; wherein at least one wavelength in each of the links comprises a reference wavelength for providing a wavelength reference to which light generating devices in the OBS network lock; and wherein at least one wavelength in each of the links comprises a routing wavelength for providing routing information between nodes.

Another embodiment is an OBS node for implementing OAM functionality in an OBS network. The OBS node comprises an OAM module ("OAMM") for processing information regarding OAM functions in the OBS network and a routing manager ("RM") for processing routing information, wherein OAM/1 transmissions comprising OAM activity information are transmitted in the OBS network using an OAM/1 wavelength; wherein a wavelength reference to which light generating devices in the OBS network lock is transmitted in the OBS network using a reference wavelength; and wherein routing information is transmitted in the OBS network using a routing wavelength.

Another embodiment is OAM-capable optical switch fabric ("OSF") for implementation in optical burst switched ("OBS") core nodes in an OBS network. The OSF comprises, for each incoming data channel, a 2×1 optical switch having a first input connected to the data channel and a second input connected to an output of an OAM/2 insert port; for each group of k 2×1 optical switches, a first k×1 multiplexer ("MUX") having inputs each connected to an output of one of the group of k 2×1 optical switches for wavelength division multiplexing data channels input thereto from the group of k 2×1 optical switches; a semiconductor optical amplifier ("SOA") module having a plurality of inputs each connected to an output of one of the first k×1 MUXes; and a 1×2 optical switch having an input connected to receive an output of the SOA module, a first output connected to an OAM/2 extract port, and a second output connected to an outgoing data channel.

Another embodiment is OAM-capable optical switch fabric ("OSF") for implementation in OBS core nodes in an OBS network. The OSF comprises, for each incoming data channel, switch means having a first input connected to the data channel and a second input connected to an output of an OAM/2 insert port; for each group of k switch means, first means for wavelength division multiplexing data channels input thereto from the group of k switch means, the first wavelength division multiplexing means having inputs each connected to an output of one of the group of k switch means; amplifying means having a plurality of inputs each connected to an output of one of the first wavelength division multiplexing means; and second switch means having an input connected to receive an output of the amplifying means, a first output connected to an OAM/2 extract port, and a second output connected to an outgoing data channel.

Another embodiment is a method of implementing OAM procedures in an OBS network comprising a plurality of OBS network elements interconnected via links. The method comprises generating an OAM burst; and inserting the OAM burst into an optical channel.

Yet another embodiment is a system for implementing OAM procedures in an OBS network comprising a plurality of OBS network elements interconnected via links. The system comprises means for generating an OAM burst; and means for inserting the OAM burst into an optical channel.

BRIEF DESCRIPTION OF THE DRAWINGS

A more complete understanding of the present invention may be had by reference to the following Detailed Description when taken in conjunction with the accompanying drawings wherein.

DETAILED DESCRIPTION OF THE DRAWINGS

Figure 1A:
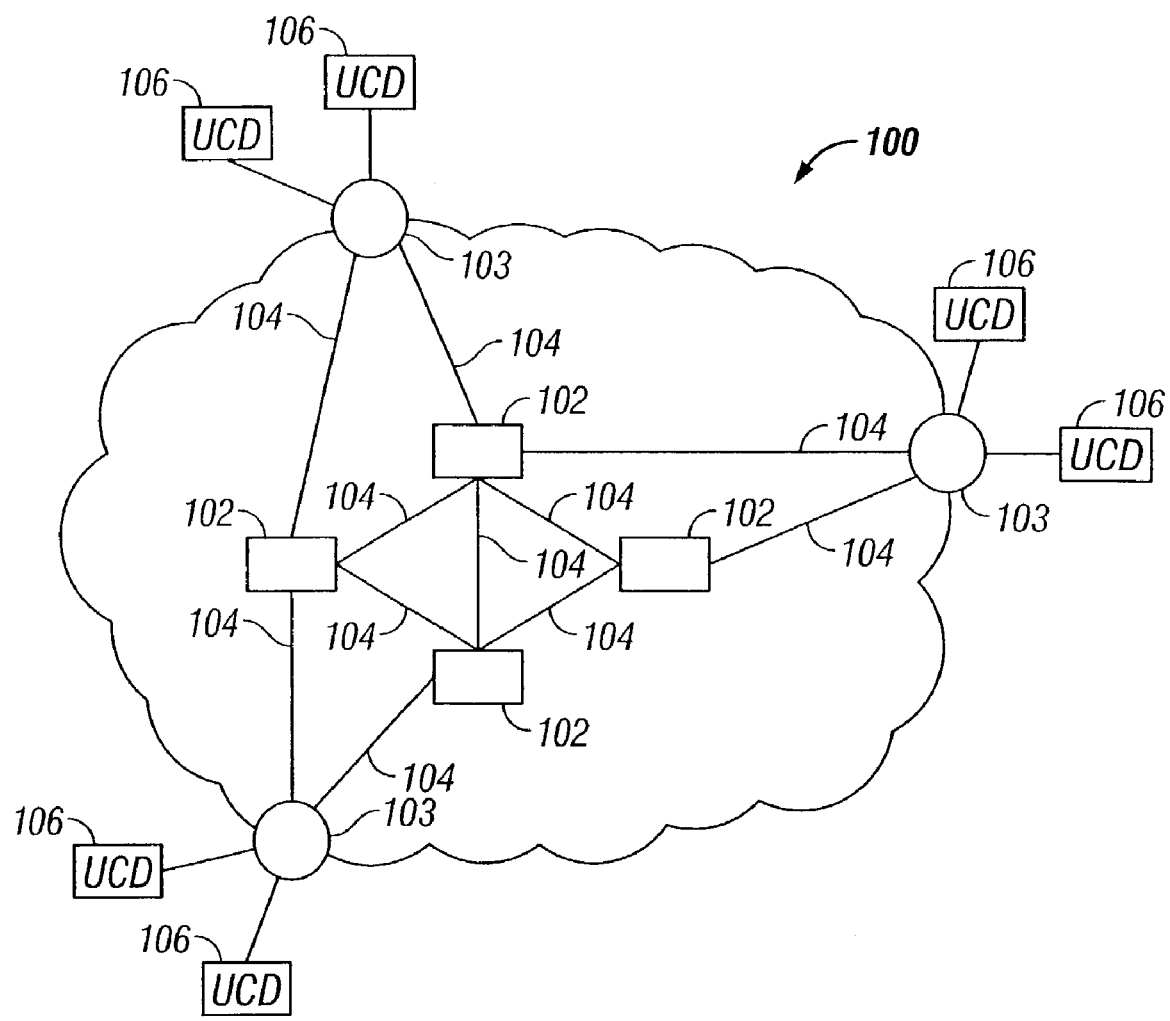
FIG. 1A illustrates an exemplary OBS network in accordance with one embodiment.

In the drawings, like or similar elements are designated with identical reference numerals throughout the several views thereof, and the various elements depicted are not necessarily drawn to scale.

FIG. 1A illustrates an exemplary OBS network 100 in accordance with one embodiment. The OBS network 100 comprises a plurality of OBS-capable core nodes 102 and OBS-capable edge nodes 103 interconnected via fiber optic links 104. Each of a plurality of user communications devices ("UCDs") 106 interfaces with the network 100 via one of the edge nodes 103. In operation, data originating from a first UCD 106 and destined for a second UCD 106 enters the network 100 via the one of the edge nodes 103 to which the first UCD is connected (referred to as the "ingress node") and is routed through one or more of the core nodes 102 to the one of the edge nodes 103 to which the second UCD is connected (referred to as the "egress node"), which transmits it to the second one of the UCDs 106.

As previously noted, in OBS technology, DBs comprising multiple data packets are switched optically at the core nodes 102 of the OBS network 100. A small control packet, called the Burst Header Packet ("BHP"), associated with each DB travels an offset time ahead of the DB along the same route and configures the optical switch for the duration of the DB at the core node.

Figure 1B:
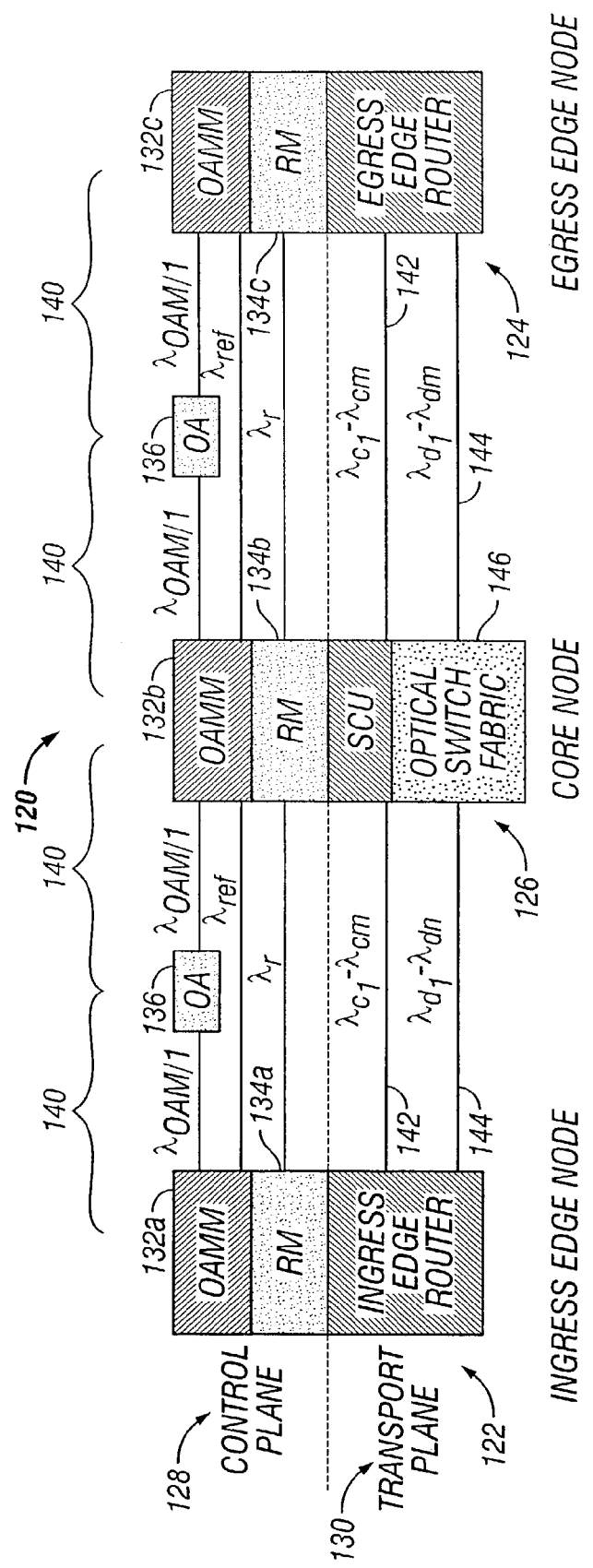
FIG. 1B is block diagram of a portion of an OBS network embodying features of one implementation.

FIG. 1B is block diagram of a portion of an OBS network 120 embodying features of one implementation. More particularly, FIG. 1B illustrates the logical wavelength distribution between two edge nodes, specifically an ingress edge node 122 and an egress edge node 124, and a core node 126 in accordance with one embodiment. In a control plane 128 of the network 120, which includes OAM Modules ("OAMMs") 132(a), 132(b), and 132(c), and Routing Modules ("RMs") 134(a), 134(b), and 134(c), three types of wavelengths are used, including an OAM/1 wavelength ("$\lambda_{OAM/1}$"), a reference wavelength ("$\lambda_{ref}$"), and a routing wavelength ("$\lambda_r$").

As will be described in greater detail hereinbelow, the OAM/1 wavelength is used to disseminate OAM activity information in every fiber between adjacent nodes of an OBS network. One OAM/1 channel is allocated to each fiber due to the fact that the fibers in the same fiber optic cable demonstrate different transmission characteristics and that these fibers in a cable might be diverted to other nodes. An OAM/1 packet on the OAM/1 channel is terminated at each optical amplifier ("OA") 136 and node 122, 124, 126; that is, the scope of OAM/1 transmissions covers a single optical amplifier section ("OAS") 140. Each OAM/1 packet is sent as a plain packet not preceded by a BHP, as it is not intended to be transmitted in OBS mode. A single OAM/1 wavelength, which is outside the gain region of the OAs 136, is used throughout the entire OBS network 120.

As will also be described in greater detail hereinbelow, the reference wavelength is used to provide a wavelength reference in an OBS network to which light-generating devices in the network are locked. The reference wavelength also provides a timing reference to enable slotted operation of optical switching and to synchronize between a BHP and its corresponding DB. A reference edge node, e.g., the ingress edge node 122, is responsible for generating of the reference wavelength. The routing wavelength is used to carry routing information between nodes on a per-link basis.

In a transport plane 130 of the network 120, control channel 142 and data channel 144 wavelengths, designated in FIG. 1B as $\lambda_{c1}$-$\lambda_{cm}$ and $\lambda_{d1}$-$\lambda_{dn}$, respectively, are used to carry BHPs and DBs, respectively. To monitor the performance of each data channel 144 and a transparent Optical Switch Fabric ("OSF") 146 in core nodes, such as the core node 126, an OAM mechanism in the transport plane 130 needs to be implemented. OAM/2 transmission is introduced for this functionality. In contrast to OAM/1, OAM/2 operates in the OBS transmission mode; that is, an OAM/2 BHP is transmitted on one of the control channel wavelengths $\lambda_{c1}$-$\lambda_{cm}$ and the corresponding OAM/2 DB is transmitted on the associated data channel wavelength $\lambda_{d1}$-$\lambda_{dn}$. It should be noted that, for the purposes of this document, all signal flow is assumed to be unidirectional.

Figure 2A:
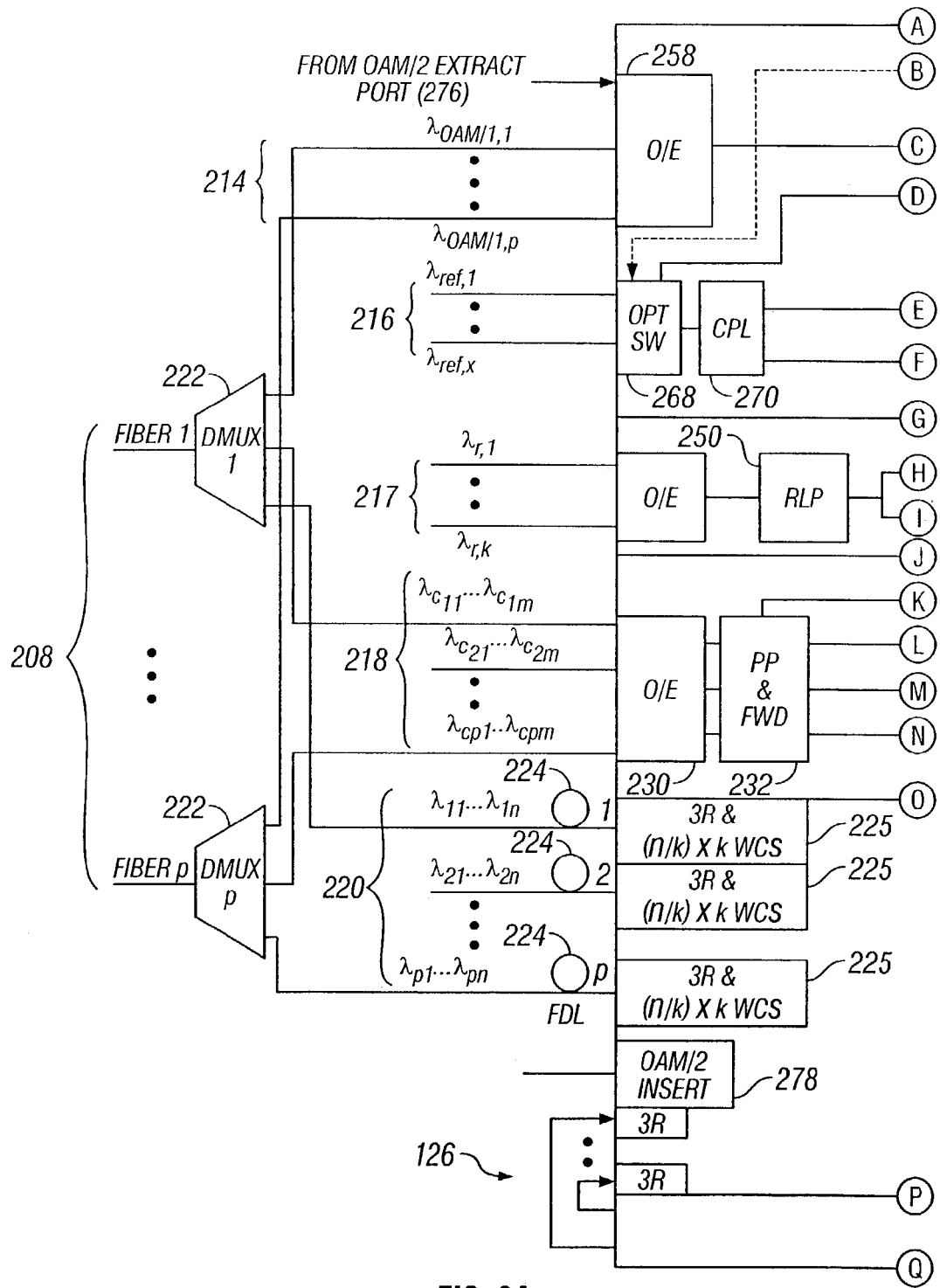
FIGS. 2A and 2B are a functional block diagram of one embodiment of an architecture of a core node of an OBS network.
Figure 2B:
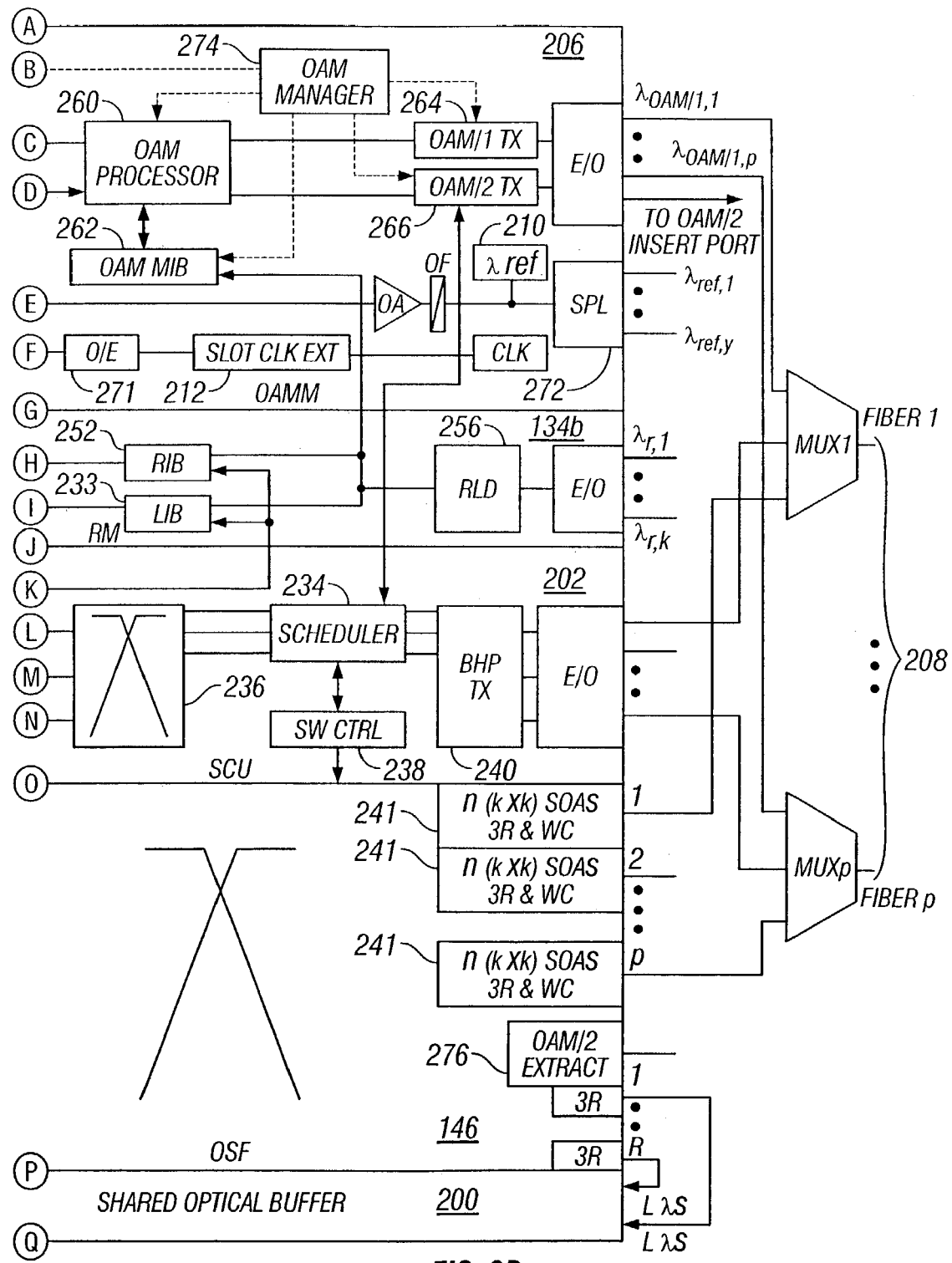

FIG. 2 is a functional block diagram of one embodiment of an architecture of a core node, represented by the core node 126. As shown in FIG. 2, the core node 126 comprises four functional sub-blocks, including the OSF 146 with a shared optical buffer 200, a Switch Control Unit ("SCU") 202, the RM 134(b), and an OAMM 206. It will be assumed that p fiber pairs 208 are connected to the node 126. The configuration of the OSF 146 can be changed in a matter of nanoseconds responsive to commands from the SCU 202 to transfer DBs to the appropriate output ports. The SCU 202 receives and preprocesses BHPs to provide switch control information to the OSF 146, as well as to resolve contention of BHPs.

The RM 134(b) is responsible for routing and forwarding information exchange between adjacent nodes and communicates such information to the SCU 202 of those nodes. The OAMM 206 is responsible for performing OAM activities as requested from relevant OAM elements as described above with respect to the description of the network architecture level. The main task of the OAMM 206 is to process OAM information for proper actions to be taken in case of a network malfunction and/or performance degradation. A secondary task of the OAMM 206 is to provide the information received on the reference wavelength 210 and a slot clock 212 to the SCU 202 and OSF 146 in a node for network-wide synchronization of wavelength and timing.

A jitter and wander extraction unit (not shown) is positioned in front of the core node 126 and corrects phase misalignment between different channels and fibers. The main timing uncertainties are jitter created by the OSF 146, dispersion due to WDM channel spread, wander by temperature fluctuation, and bit shift due to length difference between fiber paths. Following the jitter and wander extraction circuit (not shown), p OAM/1 channels 214, x reference wavelength channels 216, k routing channels 217, and m BHP, or control, channels 218 are separated from n DB, or data, channels 220 at WDM demultiplexers ("DEMUXes") 222. The DB channels 220 in each fiber 208 are delayed by Fiber Delay Line ("FDLs") 224 in front of the OSF 146 to compensate for the BHP processing delay in the SCU 202.

Once inside the OSF 146, optical signals are re-amplified, re-timed, and re-shaped ("3R regenerated") to have a good signal-to-noise ("S/N") ratio pertinent for switching and converted to internal wavelengths used in the OSF 146 by modules 225. Meanwhile, BHPs are optical-to-electrical ("O/E") converted at input O/E converters 230, decapsulated, and time-stamped at packet processors and forwarder units ("PP & FWD") 232 in the SCU 202. The forwarder portion of the unit 232 performs forwarding table lookup from a label information base ("LIB") 233 in the RM 134(b) to determine which outgoing control channel group on which to forward the BHP and the associated data channel group on which to forward the DB.

A scheduler 234 at each output port of an electrical switch fabric 236 performs scheduling for both DBs and BHPs, updating the state information of the BHP and DB, modifying BHPs, and sending optical switch configuration information to a switch controller 238. Along with time-to-send (offset time) information, the BHP is sent to a BHP TX module 240 where layer 1 and layer 2 encapsulation are performed.

Switch control information from the SCU 202 is executed slot-by-slot in a synchronous fashion. DBs flow across the optical switch path, thus configured. At the output of the OSF 146, the optical signal is 3R regenerated by modules 241 to compensate for the unequal loss from the different optical paths inside the OSF and the jitter caused by semiconductor optical amplifier ("SOA") gates. The internal wavelengths for the DBs are then converted to proper external wavelengths for transmission to downstream nodes (not shown). Shared optical buffer configuration is used for the contention control in OSF 146.

The RM 134(b) receives and processes routing and label information in a Routing and Label Processor ("RLP") 250 carried on the routing wavelength in each link to update a routing information base ("RIB") 252 and the LIB 233 used for forwarding BHPs and DBs. The reference wavelength remains fixed in the OBS network 120. The resulting topology and link status information is then distributed to other nodes by a Routing and Label Distributor ("RLD") 256.

Operation of the OAMM 206 is as follows. Wavelength DEMUXed OAM/1 packets from each fiber and OAM/2 DBs from an OAM/2 extract port 256 are O/E converted at an O/E converter 258 and input to an OAM processor 260. The OAM processor 260 processes the received OAM bursts/packets according to routines indicated by the carried information, such as BHP loss, DB loss, BER, signal-to-noise ratio, power decrease, etc. OAM/1 information from each fiber is separately processed and the results are delivered to an OAM management information base ("MIB") 262 for information update.

Once the OAM bursts/packets are processed, a sequence of responses may be initiated. For example, if there are failures in the upstream, the OAM processor 260 generates an alarm indication signal ("AIS") to the downstream and updates the MIB so that traffic is directed not to the faulty fiber path, but to the alternate paths that have been prearranged. To the upstream, a remote failure indication ("RFI") signal is delivered to warn not to send traffic through the faulty fiber. An OAM/1 TX module 264 transfers the alarm signals generated by upstream nodes to the downstream, transfers the RFI signals generated by downstream nodes to the upstream, and transfers OAM/1 type packets generated in the node 126 to the downstream.

An OAM/2 TX module 266 generates OAM/2 bursts and communicates with the scheduler 234. The reference wavelength channels 216 containing both wavelength and timing information are input to an optical switch ("OPT SW") 268 followed by an optical coupler ("CPL") 270 in the OAMM 206, from which a small portion of optical power is tapped and converted by an O/E converter 271 to extract the slot-clock signal 212. This timing information is distributed in the node 126 to serve as a reference clock. Output signals from the other end of the CPL 270 remains in the optical domain. Amplified wavelength reference signal is distributed to all of the light generating devices to serve as a reference. An optical splitter ("SPL") 272 distributes the wavelength reference signal to the downstream nodes.

An OAM manager 274 is responsible for coordinating all of the OAM building blocks in the node 126 to enable OAM activity. The OAM manager 274 notifies the OAM processor 260, OPT SW 268, OAM/1 TX module 264, and OAM/2 TX module 266 when a new OAM activity needs to be initiated or a current OAM activity needs to be terminated. Additionally, the OAM manager 274 is informed when certain OAM activity is completed. The OAM manager 274 also communicates with a database building block (not shown) to update such information as OAM policy, procedures, and security guidelines. It also contacts the database to transfer results to other OAM elements in the OAM network architecture. Another primary function of the OAM manager 274 is as a node OAM agent that interacts with the OAM logical level entities (not shown) in order to carry out a global (i.e., network-wide) OAM activity such as those end-to-end or edge-to-edge related activities.

As previously noted, OAM/1 transmissions are responsible for delivering fault-related OAM information in a packet format between adjacent nodes, not including the OSF 146. The OAM/1 channel is terminated at OAs and nodes for the fault monitoring and management. OAM/1 transmissions use the same wavelength, which is outside the gain region of the OAs (typically 1510 nm), throughout an OBS network.

To ensure reliable network operation, a mechanism must exist for monitoring the health of each channel. In one embodiment, OAM/2 transmissions serve this purpose. In particular, to obtain the exact information in channels where user data flows, one must use the same format and data channel for both data and test signals. Since a BHP and its associated DB are transmitted on different channels, an OAM/2 transmission consists of an OAM/2 DB on one of the data channels and an OAM/2 BHP on the associated control channel.

To incorporate this function into the core node 126, certain network elements are required. These include an OAM/2 TX module 266 in the OAMM 206 for generating DBs, an internal OAM/2 Extract port 276, an internal OAM/2 Insert port 278, and additional optical components in the OSF 146. The coordination of the OAM manager 274 among the OAMM 206, the SCU 202, and the OSF 146 also needs to be arranged. The coverage of OAM/2 transmissions include, for example, OSF diagnosis, link performance testing, and testing of synchronization between a DB and a BHP and ranges between adjacent OAM/2-capable nodes, between multiple OAM/2-capable nodes, or within the OSF 146 itself.

For OSF diagnosis, the OAM manager 274 initiates the OAM procedure. The OAM/2 TX module 266, the scheduler 234, and the switch controller 238 communicate with each other to set up this test. On finding appropriate slots in the desired channel to insert an OAM/2 DB, the scheduler 234 informs the OAM/2 TX module 266 to send the OAM/2 DB and the switch controller 238 to configure the OSF 146 accordingly. Following the intended optical path in the OSF 146, the OAM/2 DB emerges from the OAM/2 extract port 276. The OAM/2 DB is directed to the OAM processor 260. Following the test, time stamps of user BHPs have to be changed accordingly.

For link performance testing and testing of synchronization between BHP and DB, the OAM managers between corresponding nodes coordinate the procedure(s) by sending a specific command regarding the type of procedure required. In one of the nodes, for example, the node 126, an OAM/2 DB generated from the OAM/2 TX module 264 is inserted into an OAM/2 insert port 278 and sent downstream along with user DBs. The corresponding OAM/2 BHP is transmitted on the associated control channel. The scheduler 234 and the switch controller 238 coordinate when and how to transmit OAM/2 BHPs and DBs on the appropriate channels. At an OAM/2 extract port at the OSF output in the downstream node (not shown), OAM/2 DBs are extracted and fed to the OAM processor of the downstream node for processing, such as timing offset characteristic between DB and BHP, BER, etc.

Each wavelength reference channel 216 carries a single wavelength so that all of the wavelength converters and optical sources in the node 126 can lock on. The reference wavelength is modulated by a master slot-clock at a reference edge node and is demodulated at each node to provide synchronization information to the scheduler 234 and switch controller 238 in the SCU 202, the OAM/1 TX module 264 and the OAM/2 TX module 266 in the OAMM 206, and the modules 225, 241, in the OSF 146.

Figure 3:
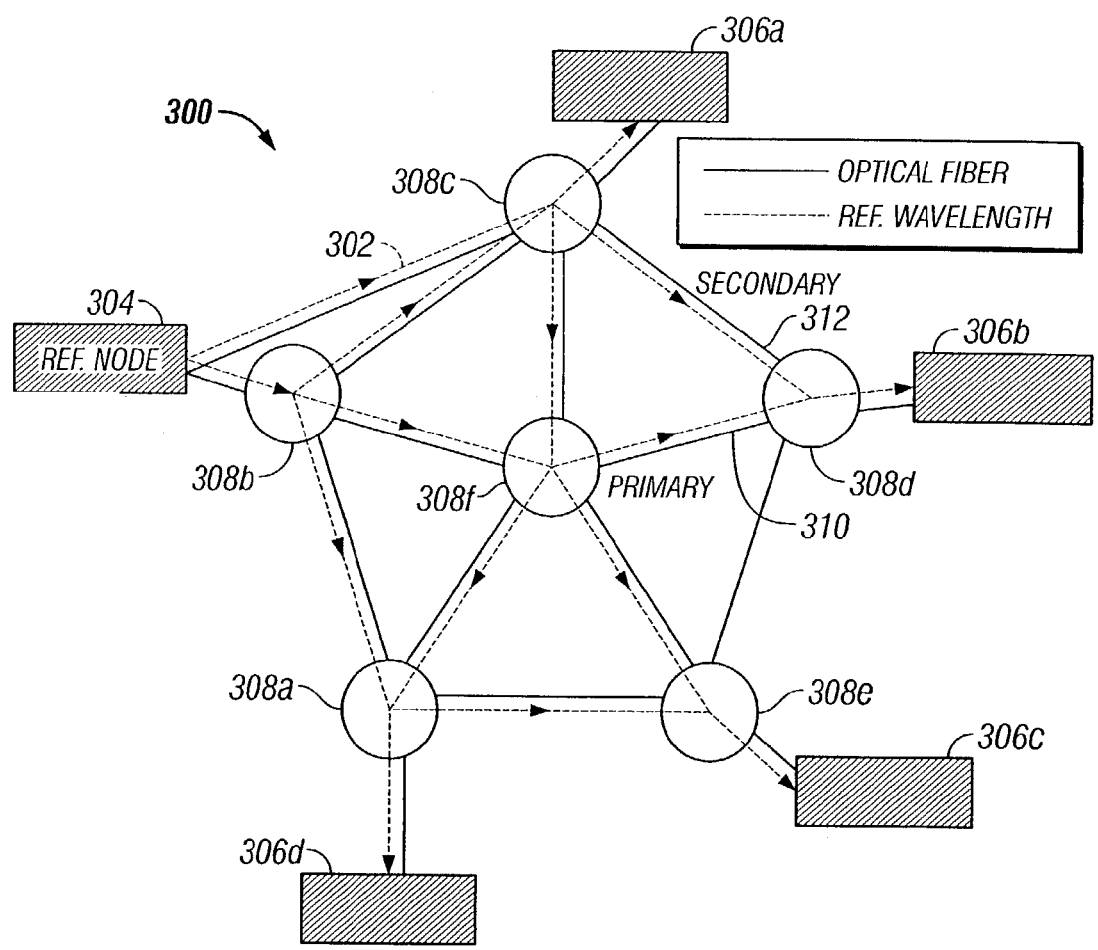
FIG. 3 illustrates an example of wavelength reference distribution in an OBS network in accordance with one embodiment.

FIG. 3 illustrates an example of wavelength reference distribution in an OBS network 300 in accordance with one embodiment. For purposes of example, it will be assumed that the maximum value of x (the number of incoming wavelength reference channels) is 2 and the maximum value of y (the number of outgoing wavelength reference channels) is 3. A reference wavelength 302 (represented in FIG. 3 by broken lines) generated by a reference ingress edge node 304 is, like a frequency standard in electrical FDM systems, distributed to all of the other edge nodes 306(a)-306(d) and core nodes 308(a)-308(f) in the network 300 without conversion at any node so as to maintain the integrity of the spectrum. Depending on the topology of the network 300, a node may be connected to several other nodes. The node 308(d) is an example of this situation. As a result, several reference wavelength inputs from different nodes (e.g., nodes 308(c) and 308(f) enter the node 308(d).

Accordingly, during installation or reconfiguration of the network 300, each node selects one primary input over one or more secondary inputs. The one or more secondary inputs serve as a backup in case of upstream link or node failure. Referring again to the example above with reference to the node 308(d), the node has a primary input on a first fiber 310 and a secondary input on a second fiber 312. In a situation in which there is only one upstream node connected to a node of interest, a proper backup route should be provided. In the network 300, one or more backup wavelength reference sources should exist in different nodes so as to offset the effects of failure of the main reference node 304. Each node must monitor its reference wavelength inputs constantly. If its primary wavelength reference input fails or degrades, an optical switch in the OAMM of the node will select a secondary wavelength reference input in a predefined manner.

Figure 4:
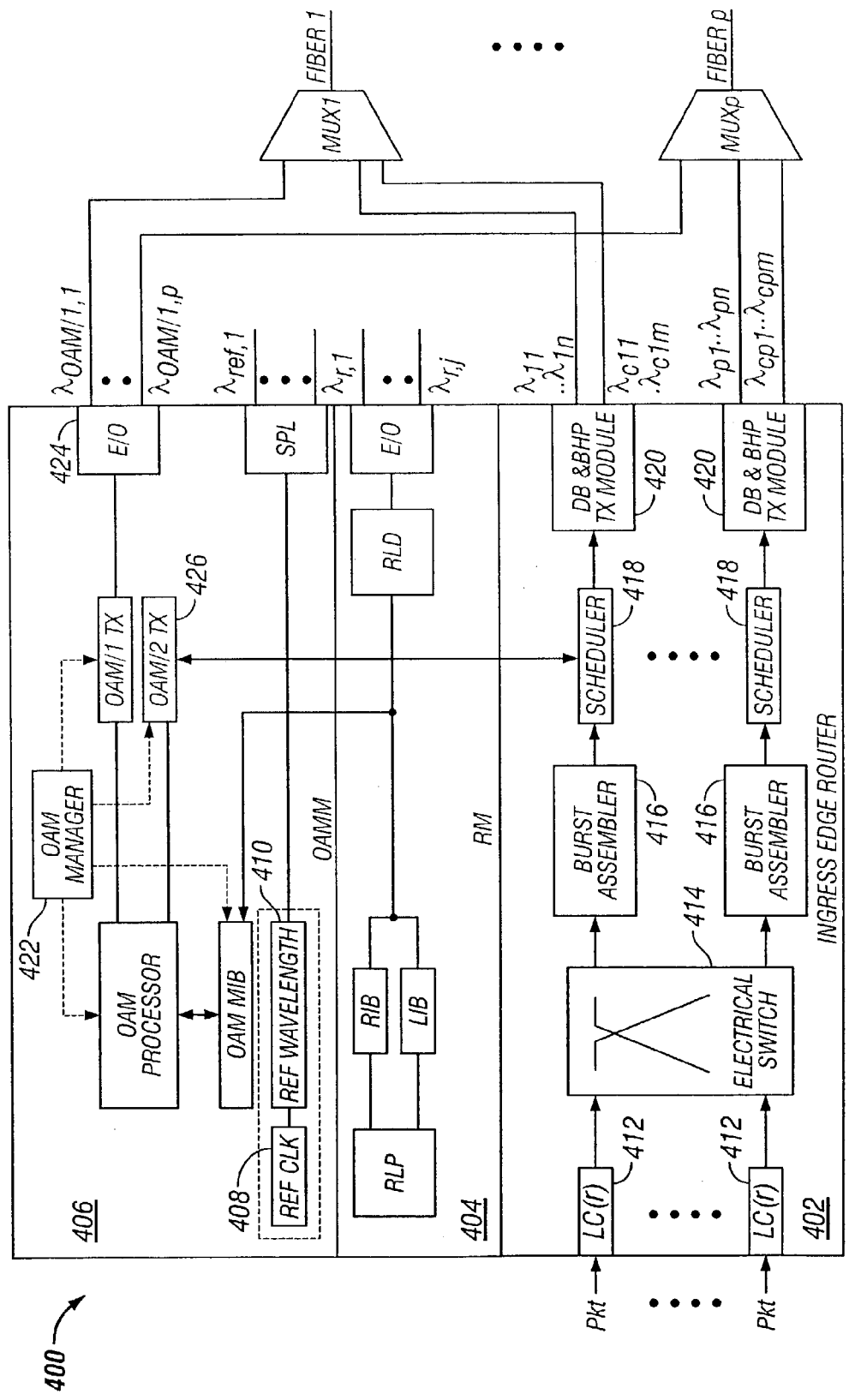
FIG. 4 is a block diagram of an ingress portion of an edge node of an OBS network in accordance with one embodiment.

FIG. 4 is a block diagram of an ingress portion 400 of an edge node, represented by the edge node 122 (FIG. 1B). The ingress portion 400 consists of an ingress edge router 402, an RM 404, and an OAMM 406. Only preassigned edge routers (i.e., those in designated reference edge nodes) are equipped with a reference slot-clock 408 and a reference wavelength source 410 in the OAMM 406. For the other edge nodes, the reference wavelength and clock signal are received from the reference edge node, extracted in an egress part of the node (see FIG. 5), and distributed internally within the node.

When a packet arrives at the ingress portion 400 from a legacy network, a receiving part of a line card ("LC(r)") 412 attaches a destination egress edge node address to the packet and forwards it through an electrical switch 414. A burst assembler 416 assembles packets into bursts depending on their egress edge node addresses and QoS requirements. Depending on the burst types and the QoS requirements, a scheduler 418 makes an arrangement of the transmission of bursts, including DBs and BHPs. A DB and BHP TX module 420 performs E/O conversion and sends DBs on data channels and BHPs on control channels, respectively, at the predetermined times.

The OAMM 406 provides wavelength and timing reference to the OBS network and provides fault and performance management. An OAM manager 422 coordinates these functions. The reference slot-clock signal generator 408 distributes the timing reference in the node for burst synchronization. The reference wavelength is provided to an E/O interface 424 in the OAMM 406 and all of the DB and BHP TX modules 420. At the output of the OAMM 406, the OAM/1 packet is sent out on every fiber. The reference wavelength modulated by the reference clock is transmitted on a link basis. An OAM/2 TX module 426 sends an OAM/2 transmission through a scheduler 418 on command from the OAM manager 422 for performance monitoring of a corresponding channel.

Figure 5:
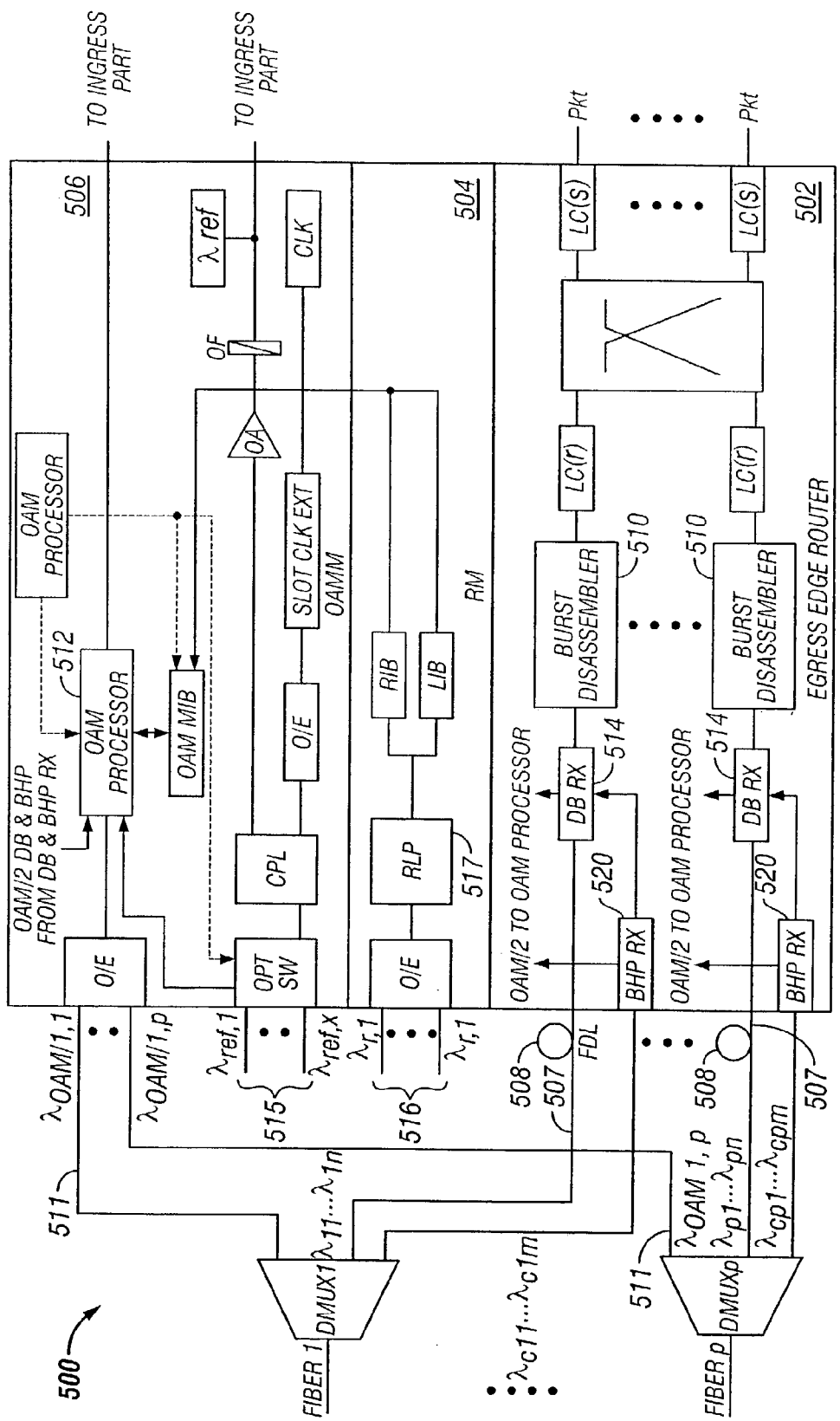
FIG. 5 is a block diagram of an egress portion of an edge node of an OBS network in accordance with one embodiment.

FIG. 5 illustrates a block diagram of an egress portion 500 of an edge node, such as the edge node 124 (FIG. 1B). The egress portion 500 consists of an egress edge router 502, an RM 504, and an OAMM 506. The egress portion 500 functions in a manner opposite that of the ingress portion 400 (FIG. 4). An incoming DB on one of several data channels 507 is delayed by a fiber delay line ("FDL") 508 to compensate for the BHP processing delay. O/E converted DBs are disassembled back into packets and forwarded to their next hops. Burst reordering and retransmission arrangements are assumed in a burst disassembler 510.

OAM/1 packets are received on an OAM/1 wavelength 511 and input to the OAM processor 512. In contrast, OAM/2 DBs arrive on one of the data channels 507. It is required that a corresponding DB RX module 514 and BHP RX module 520 receive and transfer each OAM/2 DB and OAM/2 BHP, respectively, to the OAM processor 512 in the OAMM 506. Meanwhile, the wavelength reference information received on a channel 515 is transferred to the ingress portion (FIG. 4) of the node. Routing and label information received on a channel 516 in each fiber is processed at an RLP 517 for the update.

Figure 6A:
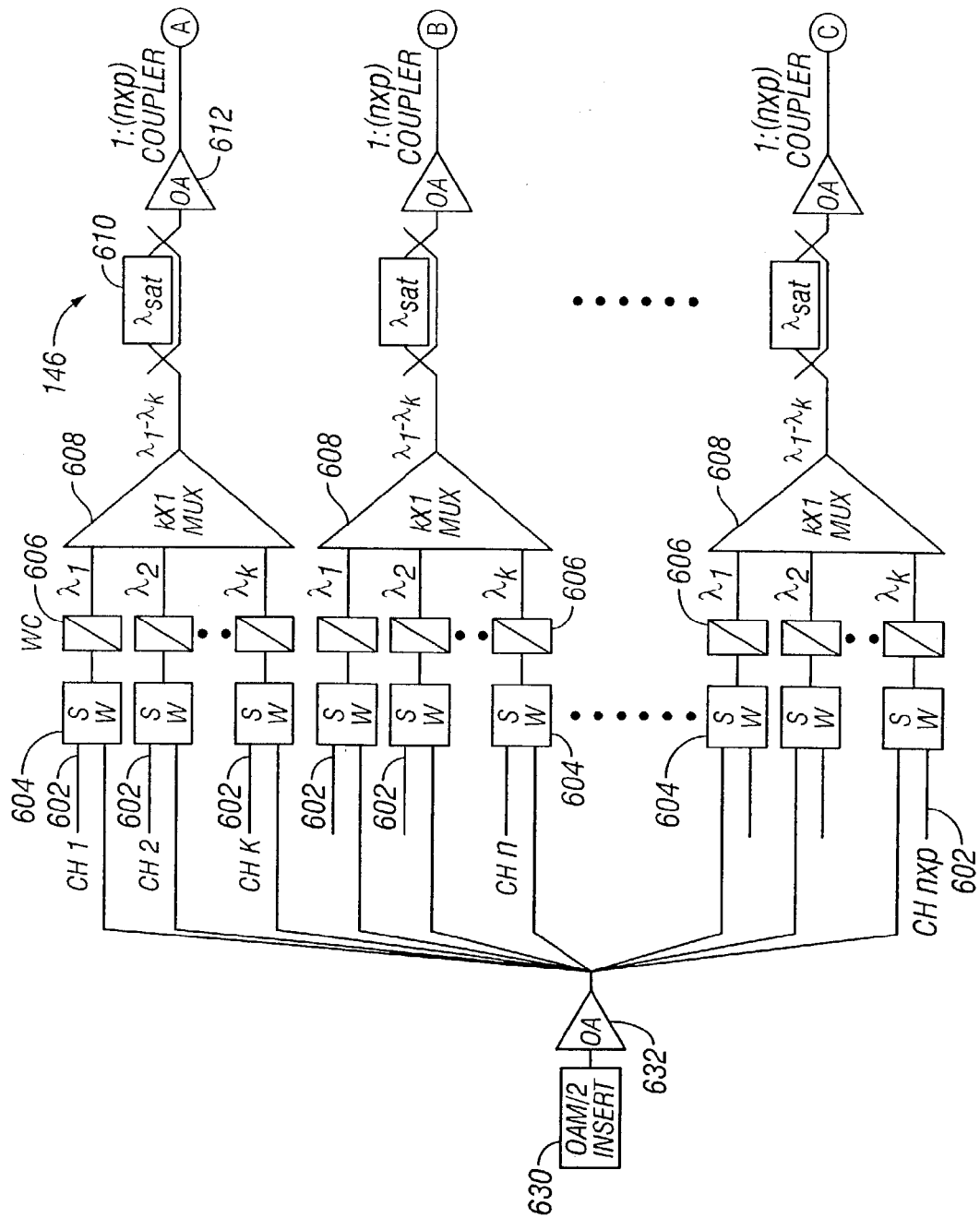
FIGS. 6A and 6B are a more detailed block diagram of an Optical Switch Fabric ("OSF") of the core node of FIG. 2.
Figure 6B:
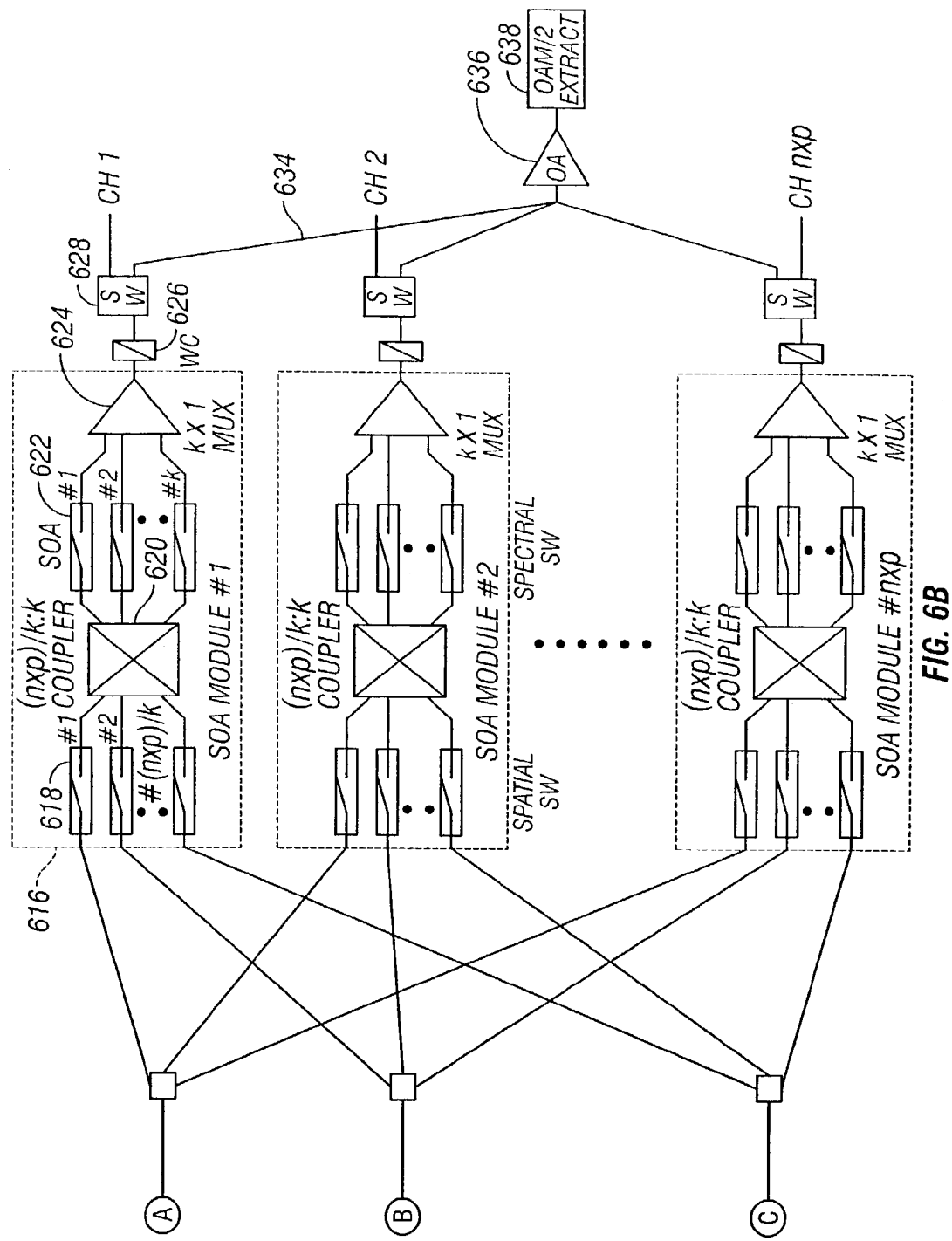

A more detailed block diagram of the OSF 146 is illustrated in FIG. 6. In particular, the OSF 146 is an OAM-capable OSF for implementation in a core node of an OBS network. It will be assumed that p fibers, each carrying n data channels, are connected to the OSF 146, which operates in synchronous mode. It will be further assumed that DBs in the network 120 are slotted and guard bands are provided between the slots to ensure proper switching of data bursts.

Operation of the OSF 146 in accordance with one embodiment is as follows. After wavelength DEMUXing at OSF input, data signals on each of the n×p data channels 602 are 3R regenerated, synchronized with other channels, and input to a respective 2×1 optical switch ("SW") 604. A wavelength converter ("WC") 606 connected to the output of each optical switch 604 changes the incoming data channel wavelength into an internal wavelength that is used for optical switching inside the OSF 146. The number of internal wavelengths is assumed to be k. A k×1 multiplexer ("MUX") 608 connected to the outputs of k wavelength converters 606 MUXes k input channels into a wavelength division multiplexed ("WDM") signal.

One saturation wavelength 610 for each wavelength MUX 608 is provided. After being processed by an OA 612, the WDM signal is distributed into n×p optical paths, each of which is connected to a semiconductor optical amplifier ("SOA") module 616. Each SOA module 616 comprises n×p/k input SOA gates 618, an n×p/k:k coupler 620, k output SOA gates 622, and a k×1 MUX 624. A wavelength converter 626 is connected to the output of each SOA module 624 for converting the internal wavelength into an external wavelength for transmission of data bursts to downstream nodes.

Referring again to the 2×1 optical switches 604, one input terminal of each switch is connected to an incoming data channel 602. The other input terminal is connected to an OAM/2 insert port 630 via an OA 632. Each 2×1 optical switch 604 connects either incoming data bursts or OAM/2 busts input from the OAMM 132(b) depending on the setup command from the SCU 202 of the node 126. This allows the checkup of the OSF condition or channel performance test between or beyond adjacent nodes. At the output of the OSF 146, OAM/2 bursts generated in the node 126 or at upstream nodes are extracted from the corresponding data channel 634 via a 1×2 optical switch 628 to an OAM/2 extract output 638. The 1×2 optical switch 628 lets user data bursts flow to downstream nodes when there is no OAM operation going on.

Referring to FIGS. 2 and 6, for OSF diagnosis, the OAM manager 274 in the OAMM 206 initiates the procedure. The OAM/2 TX module 266, the scheduler 234, and the switch controller 238 communicate with each other to set up the test. On locating appropriate slots in the desired channel to insert the OAM/2 burst, the scheduler 234 informs the OAM/2 TX module 266 to send the OAM/2 burst and informs the switch controller 238 to configure the OSF 146 accordingly. For the incoming OAM/2 DB, the OAM/2 burst exits the OAM/2 extract port 276 after taking a certain path across the OSF 146. The burst is directed to the OAM processor 274. Following the test, time stamps of user BHPs must be changed accordingly.

For data channel performance testing and testing of synchronization between a BHP and its DB, the OAM managers 274 of the corresponding nodes coordinate the procedure by sending a specific command indicating the type of performance test desired. In one node, an OAM/2 burst generated from the OAM/2 TX module 266 is inserted in the OAM/2 insert port 278 and sent downstream along with user DBs. The corresponding OAM/2 BHP is transmitted on the associated control channel. The scheduler 234 and the switch controller 238 coordinate when and how to transmit OAM/2 BHPs and bursts on appropriate channels. At the OAM/2 extract port at the OSF output in the second node, OAM/2 bursts are extracted and fed to the OAM node, processor thereof for processing OAM information.

The presence of the 2×1 optical switches 604 and the 1×2 optical switches 628 supports OAM functionality in an OBS network. For example, the embodiment supports the performance of OSF diagnosis on a channel-by-channel basis by inserting OAM bursts generated from the node to the OAM/2 insert port, selecting a desired path using a 2×1 optical switch 604 at the input and a 1×2 optical switch 628 at the output, and forwarding the OAM bursts to the OAM/2 extract port.

Additionally, it provides several types of data channel link performance monitoring, including monitoring between optical core nodes, monitoring between an OBS ingress edge node and an optical core node, monitoring between an optical core node and an OBS egress edge node, and monitoring between an OBS ingress edge node and an OBS egress edge node. The first type of monitoring is performed by inserting OAM bursts into the OAM insert port at an upstream optical core node and extracting OAM bursts from the OAM extract port at the corresponding downstream node. The second type of monitoring is performed by sending OAM bursts from an OBS ingress edge node and extracting them from the OAM extract port at the corresponding downstream optical core node. The third type of monitoring is performed by inserting OAM bursts into the OAM insert port at an upstream optical core node and extracting those at the corresponding downstream OBS egress edge node.

Yet another OAM functionality supported by the embodiments of the OSF described herein is a synchronization test between nodes. This test is performed by sending OAM DBs and corresponding BHPs into the OAM insert port and a control channel, respectively, at a node and checking them at a downstream node.

In accordance with one embodiment, OAM functionality is classified into two fundamental procedures: active mode procedures and passive mode procedures. These two classes of mechanisms are anticipated to cover virtually all OAM activities.

An active mode procedure is an OAM procedure in which an OAM burst/packet is generated and inserted into an optical channel that needs to be monitored, e.g., a control (BHP) channel or a data (DB) channel. The OAM burst performs like an ordinary DB and is treated as one of the user DBs. Active OAM procedures are useful for monitoring any OAM activities related to user DBs. In this context, it is not permissible to handle any optical user DBs during the transmission thereof. Therefore, a dedicated optical burst needs to be generated that imitates a user DB and later can be intercepted and manipulated at any point in the OBS network. By appropriately incorporating relevant information into the OAM burst (BHP or DB), the operation of an OBS network may be diagnosed. Information to be included in such an OAM burst may vary from activity to activity; however, the bursts do have common portions, which will be described hereinbelow.

Figure 7:
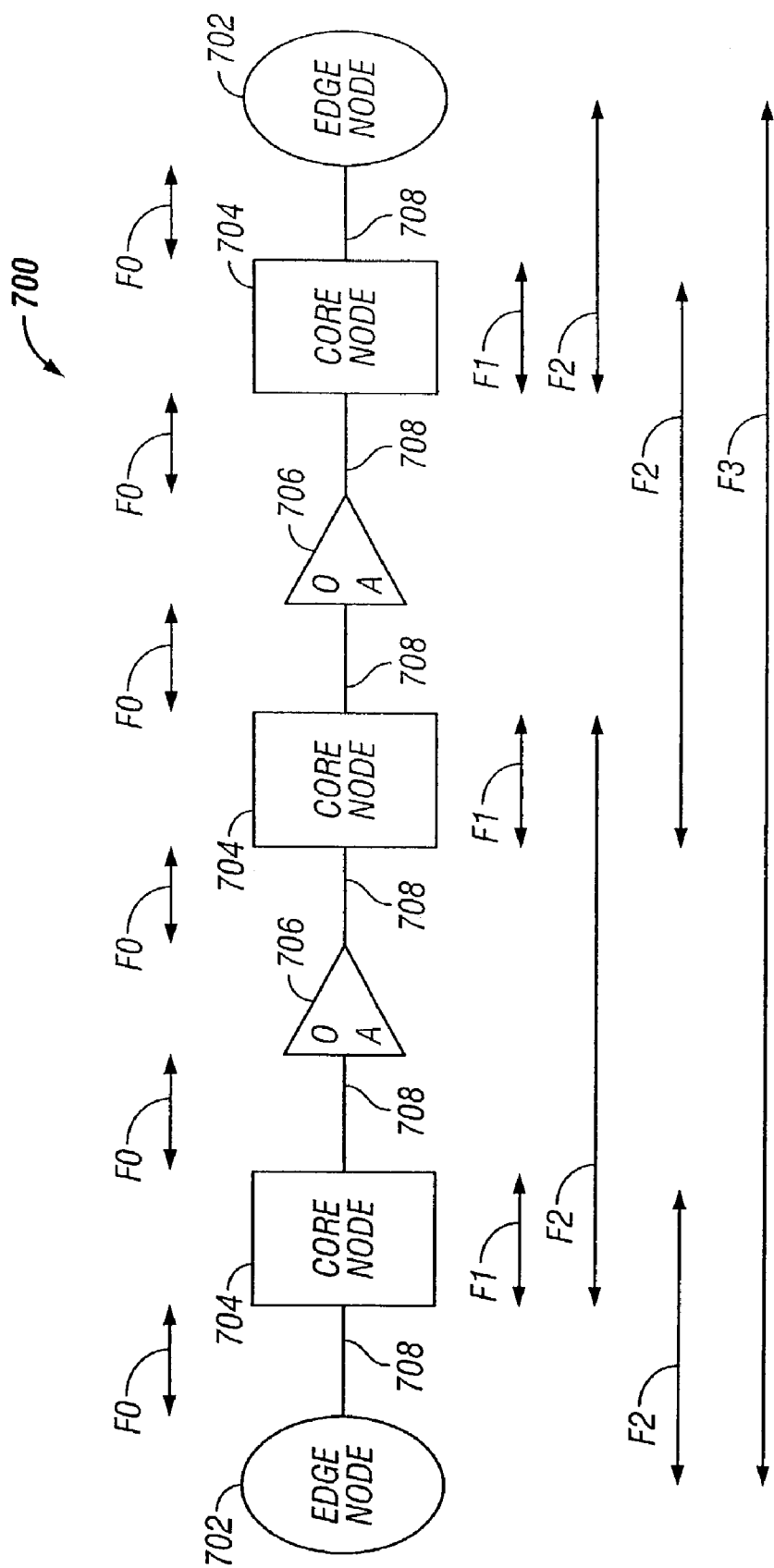
FIG. 7 illustrates the coverage span of each of several flow reference models of one embodiment.

Active mode procedures may use one of four reference flow models to accomplish the above-described goals. The coverage span of each reference flow model is illustrated in FIG. 7. FIG. 7 illustrates an embodiment of an OBS network 700 comprising edge nodes 702, core nodes 704, and OAs 706 interconnected by links 708. In FIG. 7, flows designated "F0" form a basis for launching OAM/1 packets, as described hereinbelow. F0 flows cover a range of optical amplifier sections ("OASs") and are generated at an upstream network element (e.g., a node 702, 704, or an OA 706), and terminated at an adjacent downstream network element.

Flows designated "F1" support an OAM/2 session of an intra-nodal OAM operation. F1 flows are generated at a node and are also terminated at the same node after switching through the node's OSF. Flows designated "F2" are used by an OAM/2 session to examine OAM-related problems that span a pair of adjacent nodes. F2 flows are invoked by an upstream node (e.g., an ingress edge node or a core node) and are terminated at a downstream node (e.g., an egress edge node or core node). A core node uses an insert port and an extract port to invoke and terminate an F2 flow. F2 flows may be cascaded for OAM operations that cover a pair of core nodes more than a hop away.

Flows designated "F3" support an end-to-end probe by an OAM/2 flow. F3 flows start from an ingress edge node and terminate at an egress edge node. It should be noted that all flows in OAM operations are unidirectional. This, a bidirectional OAM operation would consist of two symmetrical, unidirectional flows. Similarly, a loop-back OAM flow would have a mirror version of the flow in the reverse direction.

OAM/1 packets are dedicated to OAM at an inter-node transmission level. They are injected and extracted per transmission link; that is, they are not switched in optical core nodes. They are intended for checking an optical transmission line quality as it is practiced in an ordinary optical network, rather than for examining an OBS-specific operation. Several optical metrics can be measured by an OAM/1 session, including power level and S/N ratio, for example. An OAM/1 session covers each OAS and utilizes the F0 flow model. It will be assumed herein that every node and OAM-capable amplifier participating in a test is able to generate and terminate an OAM/1 packet.

OAM/2 sessions are the main mechanism for diagnosing a condition of the OBS data plane. Accordingly, OAM/2 sessions are equipped with the ability to detect various problems related to BHP control channels and user DB data channels and are used in various OAM diagnostic procedures.

The fundamental design concept of an OAM/2 session is to make it behave like an ordinary user OBS transmission. Accordingly, an OAM/2 session consists of two component streams. The first one is an OAM/2 BHP stream for conveying necessary information for burst switching plus some additional OAM-specific information described hereinbelow. The other one is an OAM/2 burst that is analogous to a user DB. In addition to carrying OAM-specific information, the OAM/2 DB may contain scrambled random data in order to make it appear similar to a user DB. Both OAM/2 BHPs and OAM/2 DBs are treated by an OBS network in the same fashion as user BHPs and DBs.

OAM/2 sessions can be launched as an F1 flow, an F2 flow, or an F3 flow. An OAM/2 session launched as an F1 flow is deployed to scrutinize an intra-nodal operation. An OAM/2 session launched as an F2 flow is deployed to monitor an OBS function spanning a single hop. An OAM/2 session launched as an F3 flow is deployed to consider OBS network end-to-end connection quality.

An OAM/2 session has a monitoring granularity as fine as a connection that is specified by source and destination addresses when it is initiated by an edge node. While in a core node, granularity is a lambda channel.

Conceptually, four elements are necessary for supporting OAM/2 sessions. These include an OAM/2 generator, an OAM/2 insert port, an OAM/2 terminator, and an OAM/2 extract port. The function of an OAM/2 generator is to create an appropriate OAM/2 BHP and OAM/2 DB according to an underlying OAM operation and an associated information format. In a core node, this function is performed by the OAM/2 TX module 266 (FIG. 2). The OAM/2 BHP is passed from the OAM/2 TX module 266 down to the scheduler 234, while the OAM/2 DB is directed to either the insert port 278 or the scheduler 234. In an edge node, this function is performed by the OAM/2 TX module 426 (FIG. 4) and the OAM/2 DB and BHP are passed from the OAM/2 TX module 426 to the scheduler 418.

Still referring to FIG. 2, the OAM/2 insert port 278 is located at a core node and is responsible for inserting the generated OAM/2 DB into a targeted data stream. The OAM/2 terminator functions in a manner opposite to that of the OAM/2 generator. The OAM processor 260 at the core node performs the function of the OAM/2 terminator. Similarly, a BHP RX module 520 (FIG. 5) and the DB RX module 514 (FIG. 5) jointly perform the function at the egress node.

The OAM/2 extract port 276 is the counterpart to the OAM/2 insert port 278 and is responsible for separating OAM/2 bursts from other user DBs and then passing them up to the OAM processor 260.

A passive mode procedure is one in which no artificial OAM information entities are generated and inserted. It is a non-intrusive mode of OAM procedure. Monitoring or measuring in the passive mode is related with passing-by traffic or node components. Accordingly, application of the passive mode can be seen in two main scenarios.

The first scenario is one in which OAM operations get involved with traffic at an intermediate core node or at an edge node. At an intermediate core node, the number of DBs that pass by a reference point can only be counted, since they cannot be handled or interfered with. At an edge node, specifically an egress edge node, both user DBs and BHPs can be processed, if necessary, as all traffic is terminated and converted into the electrical domain at such nodes. There is more liberty in dealing with passing-by BHPs, due to their electrical termination at each node.

The second scenario in which the passive mode is applicable is that in which OAM operations deal only with node components and have nothing to do with traffic. Chiefly, it is anticipated that these OAM procedures will be used for checking the proper operation of a node device, e.g., a laser diode or a light detector. The primary application of this scenario would be in the monitoring of physical component operation.

The two main functions that OAM operations must serve include a diagnostic function and a correction and restoration function. One of the distinctions between the two functions is that the former operates mainly on the data plane, while the latter operates on a control and maintenance plane.

OAM diagnostic functions mainly support monitoring of a network operation on the data plane. The functions focus on detecting any changes, degradation, or faults that may occur during an operation. Execution of an OAM diagnostic function results in the invocation of other suitable maintenance functions. OAM diagnostic functions constitute an initial measure for OAM operations and procedures. Diagnostic functions can implemented as an active procedure, with an OAM/1 or an OAM/2 session, and as a passive procedure. Examples of diagnostic functions include the detection of BHPs and DBs, the detection of synchronization loss between a BHP and DB pair, and the checking of optical SNR ("OSNR") optical power.

The main goal of correction and restoration functions is to support actions that are needed after learning the results of the diagnostic functions. Correction and restoration functions primarily serve to correct or restore operations in an OBS network to maintain normal operations thereof. While the diagnostic functions are closely coupled with the data plane and may affect the performance of user traffic, correction and restoration functions are de-coupled from the data plane and are instead coupled with the control and maintenance plane. Operation of a correction and restoration function is placed on an OAM supervisory channel; therefore, it does not affect the user traffic performance. Examples of correction and restoration functions include switching to a stand-by transmitter module at a node and conversion to different lambda-channels, links, or paths.

In order to derive an OAM operational procedure, an OAM information model and communication channel needs to be considered. The OAM information model considers the syntax and semantics of information to be exchanged during OAM operations; the OAM communication channel specifies which optical channel should be used to carry out such an operation.

At least four kinds of information models are deployed in an embodiment of an OAM infrastructure level. They include an OAM/1 Packet information model, an OAM/2 BHP information model, an OAM/2 DB information model, and an OAM/2 Supervisory Packet information model.

Figure 8A:
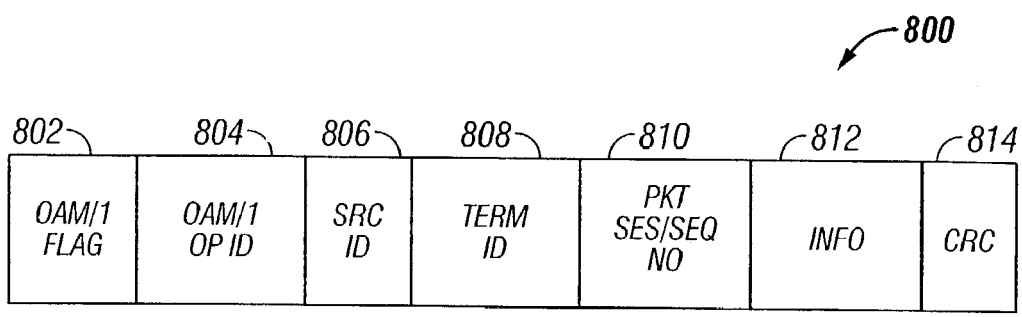
FIGS. 8A-8D respectively illustrate information models that are deployed in an embodiment of an OAM infrastructure level.

As shown in FIG. 8A, an OAM/1 Packet information model 800, contains information necessary to perform optical transmission quality checking. The minimum information necessary for such purpose is illustrated in FIG. 8A. An OAM/1 Flag field 802 designates the packet as an OAM/1 packet. An OAM/1 OP ID field 804 specifies the OAM operation intended by the packet. An SRC ID field 806 specifies the address of the generating network element. A TERM ID field 808 specifies the address of the terminating network elements. A PKT SES/SEQ NO. field 810 indicates the number of OAM/1 packets so far in the current session. An INFO field 812 contains operation-specific information. Finally, a CRC field 814 checks information integrity in the packet.

Figure 8B:
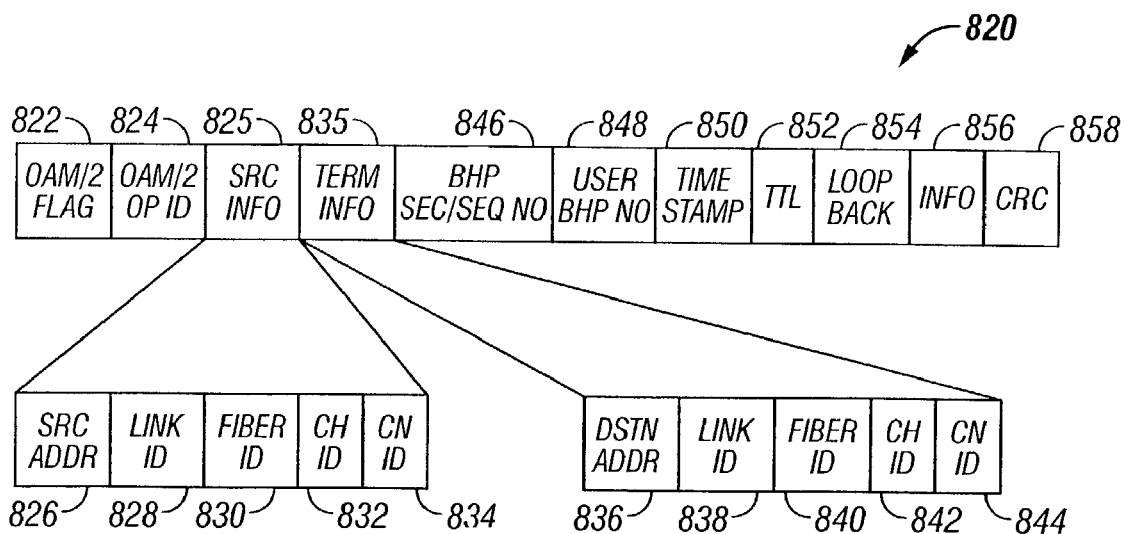

As shown in FIG. 8B, an OAM/2 BHP information model 820, contains information necessary for specifying the type and scope of and necessary details for carrying out an OAM operation without ambiguity. The minimum information necessary for such purpose is illustrated in FIG. 8B. An OAM/2 Flag field 822 alerts a node that an OAM/2 BHP is being received. An OAM/2 OP ID field 824 specifies the OAM operation intended by the packet. An SRC Info field 825 contains a number of subfields 826-834 for specifying information about the source node. In particular, an SRC ADDR field 826 specifies the address of the source node, a Link ID field 828, a Fiber ID field 830, a CH ID field 832, and a CN ID field 834 respectively indicate the link, fiber, channel, and connection identifier numbers.

Similarly, a TERM Info field 835 contains a number of subfields 836-844 for specifying information about the destination node. In particular, a DSTN ADDR field 836 specifies the address of the source node, a Link ID field 838, a Fiber ID field 840, a CH ID field 842, and a CN ID field 844 respectively indicate the link, fiber, channel, and connection identifier numbers.

A BHP SES/SEQ NO field 846 indicates the position number of this BHP in the sequence. A USR BHP NO field 848 indicates the number of user BHPs from the last OAM/2 BHP sent. A Time Stamp field 850 contains time information concerning when the OAM/2 BHP was sent and received. A TTL field 852 indicates the time duration of this BHP to stay in the network. A Loop-Back field 854 directs the remote node to return the OAM packet/burst. An INFO field 856 contains operation-specific information. Finally, a CRC field 858 checks packet information integrity.

Figure 8C:
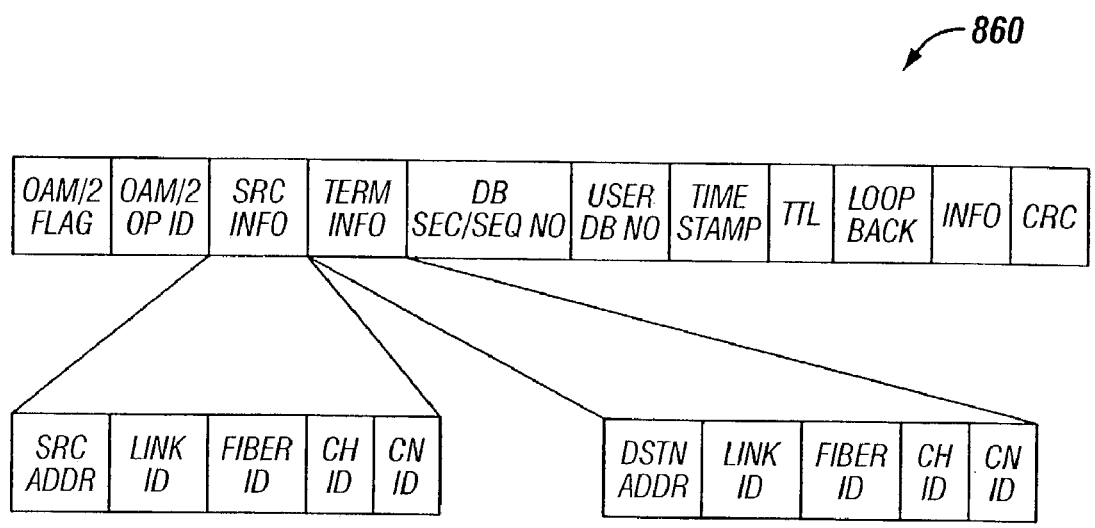
Figure 8D:
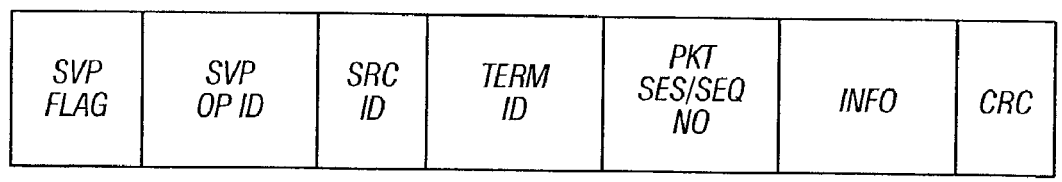

FIGS. 8C and 8D respectively illustrate an OAM/2 DB information model 860 and an OAM Supervisory Packet ("SVP") information model 862. The OAM/2 DB information model 860 contains information identical to that of the OAM/2 BHP information model 820 and will therefore not be described in detail. Similarly, the OAM SVP information model 862 contains information identical to that of the to the OAM/1 Packet information model 800 and will also not be described in detail.

There are two different types of OAM communications channels. One type is a diagnostic channel on the user data plane. The diagnostic channel is essentially the same as the user channel under consideration. The other type is an OAM supervisory channel. It supports the correction and restoration function described above.

The diagnostic channel is specified by a data channel under construction that is arranged with help from the OAM/2 TX module and the scheduler in the core node. The OAM supervisory channel serves at least two purposes. The first is to execute a correction and restoration function related to OAM operation. The second is to support communications between a pair of OAM engines located in the nodes. Such communications may arise during an OAM session control phase, e.g., a session set-up phase or termination phase, in order to convey necessary information for the involved parties to complete an OAM session.

There are several issues to be considered in developing OAM protocols. These considerations may arise in networks other than OBS networks as well. There are two types of protocols involved in OAM session undertaking, including OAM session control protocol and OAM session deployment protocol. The OAM session control protocol is responsible for initiating, starting, intervening, and terminating an OAM session. The OAM session deployment protocol, in contrast, takes care of an OAM packet/burst interchange between a pair of nodes.

OAM session control is performed through an OAM manager located at each node before, during, and after the duration of an OAM session. This protocol negotiates and exchanges information necessary to initiate and launch the required OAM session, as well as retrieve results. The protocol is based on a client-server model. The OAM client is a node that sends a request or triggers a start or termination of the session. While an OAM server is the node that responds according to the OAM client's request, the node may act as both client and server. The OAM control protocol should at provide a mechanism to set up control connection to a server on the OAM supervisory channels, commands for establishing, starting, terminating, or intervening in OAM/1 or OAM/2 sessions, detailed information associated with each control command, procedures for matching and handling underlying OAM/2 and OAM/2 packets/bursts of the OAM session, and methodologies of result-gathering or statistics computation.

OAM sessions generally can be triggered based on either a predefined event or a request. In the case of a session initiated by the occurrence of a predefined event, a session control protocol might be in a lightweight form. For example, a control connection is preassigned so that the connection setup can be shunned, command details or session confirmation is predefined and automatically initiated, thus only minimal information would be exchanged.

The OAM session deployment protocol provides necessary information associated with each OAM session. Such information includes a syntax and semantics of exchanged packets/bursts, as described hereinabove; a scheme of OAM/1 or OAM/2 packet/burst generation; a set of relevant parameters or thresholds; and a mode/scheme of session security (e.g., unauthenticated, authenticated, or authenticated with encryption).

In summary, one embodiment comprises OAM procedures, including a flow reference model, two types of OAM sessions, and four types of information models to cover OAM activities and serve as an OAM procedural template in OBS networks. In the flow reference model, four flows (F0, F1, F2 and F3) cover different spans and network layers. Two types of OAM sessions (OAM/1 and OAM/2) allow for differentiation between OAM activities in the data plane and in the control plane. The syntax and semantics of information to be exchanged during OAM activities (i.e., OAM/1 packet, OAM SVP in the control plane and OAM/2 burst and OAM/2 BHP in the data plane), have also been described.

Several advantages over the prior art are realized by the embodiments described herein. Such advantages include added performance monitoring, fault management, defect and failure detection, network monitoring, and OAM information dissemination capability, as well as a wavelength reference and timing reference distribution scheme. Additionally, the core node can run an exhaustive test for the entire OSF on a wavelength level. Additional advantages include added synchronization monitoring capability and OSF diagnosis capability. Moreover, this is the first scheme that addresses operation mechanisms and information model issues for designing and implementing OAM procedures in OBS networks and supports a full range of OAM operations, a combination of flows for more than a hop away span test, systematic and modular OAM operation capability, data channel monitoring capability in optical core nodes, synchronization test capability between a BHP and its corresponding DB, loop-back test capability, and diagnostic and supervisory channel capability.

Based upon the foregoing Detailed Description, it should be readily apparent that the present invention advantageously provides method and system for scheduling transmission of data bursts in an OBS network.

It is believed that the operation and construction of the present invention will be apparent from the foregoing Detailed Description. While the exemplary embodiments of the invention shown and described have been characterized as being preferred, it should be readily understood that various changes and modifications could be made therein without departing from the scope of the present invention as set forth in the following claims.

What is claimed is:

1. An optical burst switching ("OBS") network having operation and maintenance ("OAM") functionality, the OBS network comprising a plurality of OBS nodes interconnected via links, wherein each of the OBS nodes comprises:
   an OAM module ("OAMM") for processing information regarding OAM functions in the OBS network; and
   a routing manager ("RM") for processing routing information,
   wherein at least one wavelength in each of the links comprises an OAM/1 wavelength for OAM/1 transmissions between nodes, the OAM/1 transmissions comprising OAM activity information;
   wherein at least one wavelength in each of the links comprises a reference wavelength for providing a wavelength reference to which light generating devices in the OBS network lock; and
   wherein at least one wavelength in each of the links comprises a routing wavelength for providing routing information between nodes.

2. The OBS network of claim 1 wherein each OAM/1 transmission comprises a plain data packet without a corresponding burst header packet ("BHP").

3. The OBS network of claim 1 further comprising an optical amplifier ("OA") disposed on the link between two adjacent OBS nodes, wherein each OAM/1 transmission covers a single optical amplifier ("OA") section.

4. The OBS network of claim 3 wherein each OAM/1 transmission is outside a gain region of the OA.

5. The OBS network of claim 1 wherein the routing information is provided on a per-link basis.

6. The OBS network of claim 1 wherein user channels in each of the links support OAM/2 activities and wherein information regarding the performance of data channels of the OBS network resulting from the OAM/2 activities is carried on a supervisory channel.

7. The OBS network of claim 6 wherein an OAM/2 transmission comprises an OAM/2 burst header packet ("BHP") and a corresponding OAM/2 data burst ("DB").

8. The OBS network of claim 1 wherein at least one of the OBS nodes comprises a core OBS node, the core node comprising a switch control unit ("SCU") and an optical switch fabric ("OSF") for switching burst transmissions.

9. The OBS network of claim 8 further comprising a control plane and a data plane, wherein the RM and OAMM of each of the OBS nodes are located in the control plane and wherein the SCU and the OSF of the core OBS node is located in the data plane.

10. The OBS network of claim 1 wherein at least one of the OBS nodes comprises an ingress edge OBS node, the ingress edge node comprising an ingress edge router for processing and transmitting burst header packets ("BHPs") and corresponding data bursts ("DBs").

11. The OBS network of claim 10 wherein the OAMM of the ingress edge OBS node comprises a reference slot-clock.

12. The OBS network of claim 10 wherein the OAMM of the ingress edge OBS node comprises a reference wavelength source.

13. The OBS network of claim 10 wherein the OAMM of the ingress edge OBS node comprises an OAM/1 transmission module for generating OAM/1 transmissions.

14. The OBS network of claim 10 wherein the OAMM of the ingress edge OBS node comprises an OAM/2 transmission module for generating OAM/2 transmissions.

15. The OBS network of claim 1 wherein at least one of the OBS nodes comprises an egress edge OBS node, the egress edge OBS node comprising an egress edge router for receiving and processing burst header packets ("BHPs") and corresponding data bursts ("DBs").

16. An optical burst switching ("OBS") node for implementing operation and maintenance ("OAM") functionality in an OBS network, the OBS node comprising:
 an OAM module ("OAMM") for processing information of the OBS network regarding OAM functions in the OBS network; and
 a routing manager ("RM") for processing routing information,
 wherein OAM/1 transmissions comprising OAM activity information are transmitted in the OBS network using an OAM/1 wavelength;
 wherein a wavelength reference to which light generating devices in the OBS network lock is transmitted in the OBS network using a reference wavelength; and
 wherein routing information is transmitted in the OBS network using a routing wavelength.

17. The OBS node of claim 16 wherein the OBS node is connected to an adjacent OBS node in the OBS network via an optical amplifier ("OA"), wherein each OAM/1 transmission covers a single optical amplifier ("OA") section.

18. The OBS node of claim 17 wherein each OAM/1 transmission is outside a gain region of the OA.

19. The OBS node of claim 16 wherein user channels in each of the links support OAM/2 activities and wherein information regarding the performance of data channels of the OBS network resulting from the OAM/2 activities is carried on a supervisory channel.

20. The OBS node of claim 19 wherein an OAM/2 transmission comprises an OAM/2 burst header packet ("BHP") and a corresponding OAM/2 data burst ("DB").

21. The OBS node of claim 16 further comprising a switch control unit ("SCU") and an optical switch fabric ("OSF") for switching burst transmissions between nodes in the OBS network.

22. The OBS node of claim 16 further comprising an ingress edge router for processing and transmitting burst header packets ("BHPs") and corresponding data bursts ("DBs").

23. The OBS node of claim 22 wherein the OAMM comprises a reference slot-clock.

24. The OBS node of claim 22 wherein the OAMM comprises a reference wavelength source.

25. The OBS node of claim 22 wherein the OAMM comprises an OAM/1 transmission module for generating OAM/1 transmissions.

26. The OBS node of claim 22 wherein the OAMM comprises an OAM/2 transmission module for generating OAM/2 transmissions.

27. The OBS network of claim 16 further comprising an egress edge router for receiving and processing burst header packets ("BHPs") and corresponding data bursts ("DBs").

* * * * *